(12) United States Patent
Wang et al.

(10) Patent No.: US 9,048,894 B2
(45) Date of Patent: Jun. 2, 2015

(54) METHOD AND APPARATUS OF BEAM TRAINING FOR MIMO OPERATION

(71) Applicant: MEDIATEKk Singapore Pte. Ltd., Solaris (SG)

(72) Inventors: James June-Ming Wang, San Marino, CA (US); Vishakan Ponnampalam, San Jose, CA (US); Jianhan Liu, San Jose, CA (US); Chao-Chun Wang, Taipei (TW); Chi-Shi Yee, Hsinchu County (TW); YungPing Hsu, Taipei (TW)

(73) Assignee: Mediatek Singapore Pte. Ltd., Singapore (SG)

(\*) Notice: Subject to any disclaimer, the term of this patent is extended or adjusted under 35 U.S.C. 154(b) by 44 days.

(21) Appl. No.: 13/899,540

(22) Filed: May 21, 2013

(65) Prior Publication Data
US 2013/0315325 A1    Nov. 28, 2013

Related U.S. Application Data

(60) Provisional application No. 61/650,220, filed on May 22, 2012.

(51) Int. Cl.
*H04B 15/00*    (2006.01)
*H04B 7/04*    (2006.01)
*H04B 7/06*    (2006.01)
*H04B 7/08*    (2006.01)

(52) U.S. Cl.
CPC .............. *H04B 7/043* (2013.01); *H04B 7/0417* (2013.01); *H04B 7/0695* (2013.01); *H04B 7/088* (2013.01)

(58) Field of Classification Search
CPC .. H04B 7/0617; H04B 7/0628; H04B 7/0417; H04B 7/0491; H04B 7/0634

USPC ................. 375/229–236, 259–285, 295–352
See application file for complete search history.

(56) References Cited

U.S. PATENT DOCUMENTS

| | | | | |
|---|---|---|---|---|
| 2006/0264184 | A1 | 11/2006 | Li et al. | 455/101 |
| 2007/0230639 | A1 | 10/2007 | Stirling-Gallacher | 375/347 |
| 2010/0056062 | A1* | 3/2010 | Zhang et al. | 455/63.1 |
| 2010/0157955 | A1* | 6/2010 | Liu et al. | 370/336 |
| 2010/0214169 | A1* | 8/2010 | Kafle | 342/368 |
| 2010/0215027 | A1* | 8/2010 | Liu et al. | 370/338 |
| 2010/0265895 | A1* | 10/2010 | Bracha | 370/329 |
| 2010/0265922 | A1* | 10/2010 | Bracha | 370/336 |
| 2011/0317630 | A1* | 12/2011 | Zhu et al. | 370/329 |

OTHER PUBLICATIONS

Su-Khiong (SK) Yong et al. 60 GHz Technology for GBPS WLAM and WPAN, from Theory to Practice, 2011, chapter 4, p. 89-115.

\* cited by examiner

*Primary Examiner* — Sam K Ahn
*Assistant Examiner* — James M Perez
(74) *Attorney, Agent, or Firm* — Zheng Jin; Helen Mao (57) ABSTRACT

The disclosed invention provides an efficient method for beam training to enable spatial multiplexing MIMO operation and spatial combining in a wireless network. The invention discloses a simple and efficient beam-training algorithm and protocol for MIMO operation that operates in high SNR condition for reliable MIMO operation. In one novel aspect, the best MIMO beam combinations are determined after TX sector sweeping and RX sector sweeping. In addition, the selection criteria includes not only signal quality, but also considers mutual interference and leakage among multiple MIMO spatial streams to improve overall MIMO performance.

16 Claims, 7 Drawing Sheets

METHOD AND APPARATUS OF BEAM TRAINING FOR MIMO OPERATION

CROSS REFERENCE TO RELATED APPLICATIONS

This application claims priority under 35 U.S.C. §119 from U.S. Provisional Application No. 61/650,220, entitled "Method and Apparatus for Beam Training for MIMO Operation," filed on May 22, 2012, the subject matter of which is incorporated herein by reference.

TECHNICAL FIELD

The disclosed embodiments relate generally to wireless network communications, and, more particularly, to beam training methods for multiple-input multiple-output (MIMO) operation.

BACKGROUND

Spatial multiplexing multiple input and multiple output (MIMO) technique is used to increase the data rate (and spectral efficiency) by transmitting multiple data streams via different spatial paths simultaneously. Spatial combining technique, on the other hand, refers to the technique that combines the same data stream via different spatial paths to enhance signal quality. Spatial multiplexing and spatial combining techniques have been widely employed in mobile communications systems such as IEEE 802.11n (2.4 GHz and 5 GHz) and IEEE 802.11ac (5 GHz). For 802.11n and 802.11ac, the signal wavelength is large comparing to the feature size of objects in the propagation environment. As a result, NLOS signal propagation is dominated by the signal scattering from various objects. Due to the severe scattering, OFDM signal is often used in such systems and the spatial multiplexing and spatial combining are done on a per-tone (per-subcarrier) basis in the digital domain.

For higher frequency systems such as IEEE 802.11ad (60 GHz), the signal propagation characteristics change as the signal wavelength becomes small comparing to the feature size of objects in the propagation environment. As a result, signal propagation is dominated by ray-like propagation with discrete paths in space. The signal quality can be greatly enhanced if either TX or RX antenna beams or both TX and RX antenna beams are directed toward strong spatial signal path. The improved signal quality via aligning the antenna beams with strong spatial signal path manifests both increased signal strength (higher signal-to-noise ratio) and reduced delay spread. Since the delay spread is reduced, spatial combining can be wholly or partially done in RF domain (instead of digital domain) to simplify implementation.

In general, phased-array antenna with steerable antenna beam in MIMO operation provides antenna gain and enables mobility. Eigen-beamforming is one method of antenna beam training. The Eigen-beamforming requires transmitter and receiver to estimate the channel response matrix first. The channel response matrix is then decomposed using singular value decomposition (SVD). The MIMO operation uses n dominant Eigen modes (corresponding to n spatial paths) for transmitting n spatial streams. The Eigen beamforming method suffers from the problem that the channel response matrix is obtained in lower signal-to-noise condition since no beamforming is used during the channel estimation.

Another method of antenna beam training is multi-stage iterative training using power method. In the power method, the receiver sends back the normalized receive vector in the n antennas to the transmitter. The transmitter uses the receive vector as the next transmit antenna weight. The antenna weight quickly converges to the first Eigen vector after a few iterations. This process continues until the n vectors (antenna weight vectors) are obtained. The power method suffers from the problem that it only works (converges) in the presence of high signal-to-noise ratio.

The beam training protocol provided in IEEE 802.11ad involves either transmitter or receiver to sweep through a number of antenna beam directions to determine the beam with the best signal quality. For efficient beam training, multiple stages of beam training are provided. The initial stage, called the SLS (sector level sweep), provides coarse antenna beam training. The subsequent stage, called the beam refinement protocol or beam tracking, provides the fine-tuning of antenna beam for improved pointing accuracy and higher signal quality. These beam training protocols are generally used to train a single spatial beam for the transmission of a single data stream.

A solution is sought for training multiple antenna beam combinations to allow for multiple data streams for increased data rate, or to allow combining of the same data stream for enhanced signal quality.

SUMMARY

The disclosed invention provides an efficient method for beam training to enable spatial multiplexing MIMO operation and spatial combining in a wireless network. The invention discloses a simple and efficient beam-training algorithm and protocol for MIMO operation that operates in high SNR condition for reliable MIMO operation without the drawbacks of prior art methods.

In a first embodiment, an initiator and a responder exchange beam-training parameters to start a MIMO training procedure. During TX sector sweeping, the initiator sends training packets through all TX sectors, while the responder receives the training packets with omni-direction beam. The responder sends back a set of selected TX sectors with good received signal quality. During RX sector sweeping, the initiator sends training packet with omni-direction beam, while the responder receives the training packets through all RX sectors. The responder determines a set of selected RX sectors with good received signal quality. During beam combination training, the initiator and the responder sweep through the selected TX sectors and RX sectors together. The responder determines the best MIMO beam combinations for multiple MIMO spatial streams based on SNIR and sends back to the initiator. Finally, beam refinement is performed to fine-tune the antenna beams for improved signal quality. In one novel aspect, the leakage from one spatial stream into the receive beam of another spatial stream is considered as interference for SNIR calculation.

In a second embodiment, an initiator and a responder exchange beam-training parameters to start a MIMO training procedure. During TX sector sweeping, the initiator sends training packets through all TX sectors, while the responder receives the training packets with omni-direction beam. The responder sends back a set of selected TX sectors with good received signal quality. During RX sector sweeping, the initiator sends training packet using each selected TX sector, while the responder receives the training packets through all RX sectors. The responder selects one RX sector with good received signal quality for each selected TX sector. The responder determines the best MIMO beam combinations for multiple MIMO spatial streams based on SNIR and sends back to the initiator. Finally, beam refinement is performed to fine-tune the antenna beams for improved signal quality. In one novel aspect, the leakage from one spatial stream into the receive beam of another spatial stream is considered as interference for SNIR calculation.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
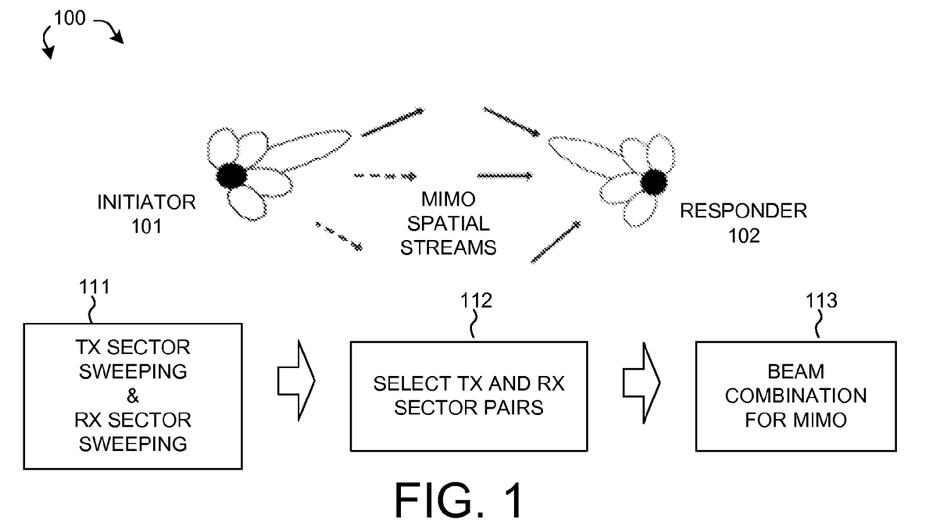
FIG. 1 illustrates a MU-MIMO operation with antenna beam training for multiple spatial streams in a wireless system in accordance with one novel aspect.

FIG. 1 illustrates a MU-MIMO operation with antenna beam training for multiple spatial streams in a wireless system 100 in accordance with one novel aspect. Wireless system 100 comprises an initiator 101 and a responder 102. Both initiator 101 and responder 102 are equipped with antenna arrays to support MIMO operation for multiple spatial streams. To enable MIMO operation, initiator 101 signals to responder 102 to start a MIMO training with a list of MIMO training parameters. The purpose of MIMO training is for antenna array beamforming, where both transmitting antennas and receiving antennas are steered with the best beam combinations to increase data rate and enhance signal quality.

In the example of FIG. 1, the intended direction is initiator 101 is the transmitter of MIMO signal and responder 102 is the receiver of MIMO signal. Note that an initiator can also initiate a MIMO training in which the initiator is the receiver of MIMO signal. In step 111, initiator 101 performs TX sector sweeping, where training packets are transmitted to responder 102 through the TX sectors, each sector corresponds to a specific TX antenna beam/pattern (e.g., direction/weight). During RX sector sweeping, training packets are transmitted from initiator 101 to responder 102, which sweeps through the RX sectors, each sector corresponds to a specific RX antenna beam/pattern (e.g., direction/weight). In step 112, responder 102 records the received signal quality (e.g., signal-to-noise ratio (SNR)) and determines a number of beam combinations (selected TX and RX sector pairs) based on the results of TX sector sweep and RX sector sweep. The number of beam combinations needs to be greater or equal to the number of spatial streams. In step 113, from the selected TX and RX sector pairs, responder 102 determines the best MIMO beam combinations for the multiple MIMO spatial streams based on signal-to-(noise+interference) ratio (SNIR) criteria.

In one novel aspect, the simple and efficient beam training method operates in high SNR condition for reliable operation. Furthermore, by considering mutual interference or leakage among the multiple MIMO spatial streams, the MIMO beam combination selection is more accurate to improve overall MIMO performance.

Figure 2:
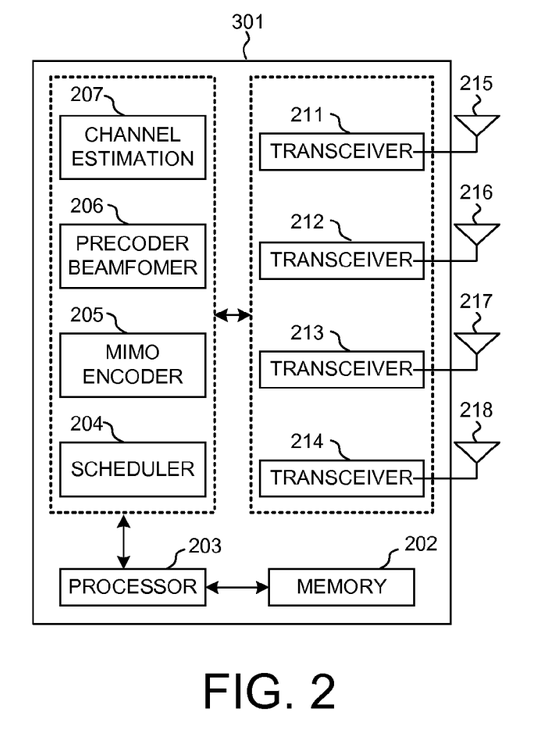
FIG. 2 illustrates a simplified block diagram of a wireless device in a wireless system in accordance with one novel aspect.

FIG. 2 illustrates a simplified block diagram of a wireless device 201 in a wireless system in accordance with one novel aspect. Wireless device 201 comprises memory 202, a processor 203, a scheduler 204, a MIMO encoder 205, a beamformer/precoder 206, a channel estimation module 207, and a plurality of transceivers 211-214 coupled to a plurality of antennas 215-218, respectively. The wireless device receives RF signals from the antenna, converts them to baseband signals and sends them to the processor. RF transceiver also converts received baseband signals from the processor, converts them to RF signals, and sends out to the antenna. Processor 203 processes the received baseband signals and invokes different functional modules to perform features in the device. Memory 202 stores program instructions and data to control the operations of the device. FIG. 2 further illustrates functional modules in the wireless device that carry out embodiments of the current invention. The functional modules may be implemented by hardware, firmware, software, or any combination thereof.

Figure 3:
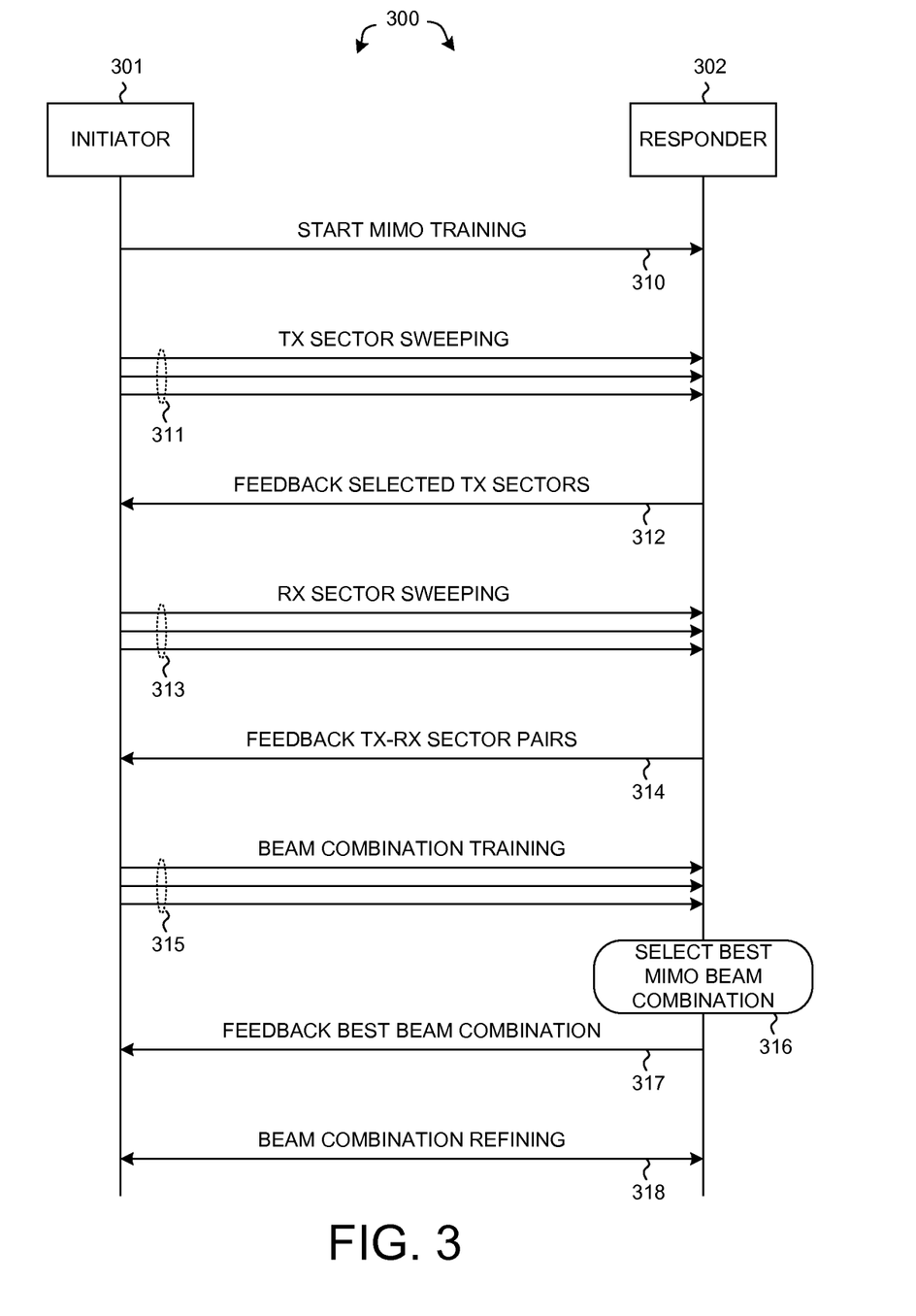
FIG. 3 illustrates a message/signal exchange flow of a first embodiment of antenna beam training for MIMO operation.

FIG. 3 illustrates a message/signal exchange flow of a first embodiment of antenna beam training for MIMO operation in a wireless communications system 300. Wireless communications system 300 comprises an initiator 301 and a responder 302. In step 310, the initiator sends a MIMO beam-training message to the responder to start a MIMO training procedure. The beam-training message comprises MIMO training parameters such as the number of TX sectors, the number of RX sectors, the number of MIMO spatial streams, the number of candidate beam combinations, and other relevant parameters. For example, the duration and timing of training packets may be included as part of the parameters. In the example of FIG. 3, the initiator is the transmitter of MIMO signal. However, an initiator can also initiate a MIMO training in which it is the receiver of MIMO signal.

In step 311, during TX sector sweeping, initiator 301 starts sending training packets to responder 302. Each training packet is a short packet designed for beam training—allowing the receiver to measure the received signal quality, but not carrying extra data payload to reduce time. For TX sector sweeping, the training packets are sent through all the TX sectors—one packet per sector with a gap (inter-frame spacing) between consecutive training packets. Responder 302 receives the training packets with an omni-direction antenna pattern and records the received signal quality for each TX sector. In step 312, responder 302 feedbacks a set of selected TX sectors with good received signal quality to initiator 301. In step 313, RX sector sweeping is performed. Initiator 301 transmits training packets with a semi-omni antenna pattern while responder 302 sweep through all the RX sectors with dwell time of each RX sector corresponding to the training packet duration and timing. Responder 302 again records the received signal quality for each RX sector. In step 314, responder 302 optionally feedbacks the candidate beam combinations (e.g., a list of TX-RX sector pairs) to initiator 301. Based on the results of TX sector sweep and RX sector sweep, the selection of RX sectors is based on signal quality (e.g., SNR).

In step 315, the initiator and the responder start sweeping the selected TX sectors and the selected RX sectors together for beam combination training. During the beam combination training, the initiator transmits a training packet through one of the selected TX sectors while the responder receives the training packet through the paired RX sector in one beam combination. Because the initiator already knows the selected TX-RX sector pairs, it knows how many times to send the training packets for each selected TX sector. In an alternative embodiment, the responder might not feedback the beam combinations in step 314. As long as the initiator knows the number of candidate beam combinations, it still knows how many times to send the training packets for each selected TX sector for beam combination training. The responder records the signal quality for each selected TX-RX sector pair during the beam combination training.

In step 316, responder 302 determines the best MIMO beam combinations for the multiple MIMO spatial streams. If there are two MIMO spatial streams, then two best MIMO beam combinations are determined. For spatial multiplexing, the best MIMO beam combinations are determined based on the highest SNIR. For spatial combining, the best MIMO beam combinations are determined based on the highest total combined power (SUM power). In step 317, responder 302 feedbacks the best MIMO beam combinations to initiator 301. Finally, in step 318, initiator 301 and responder 302 perform beam refinement, which fine-tunes the antenna beams for improved pointing accuracy and higher signal quality. More details of the first MIMO training embodiment are now described below accompanied with FIGS. 4A-4C.

Figure 4A:
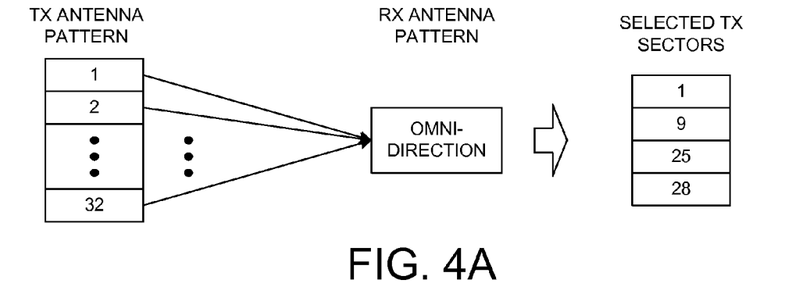
FIG. 4A illustrates a first step of the first embodiment of antenna beam training.

FIG. 4A illustrates a first step of the first embodiment of antenna beam training. The first step involves TX sector sweeping after initializing a MIMO training between an initiator and a responder. In the example of FIG. 4A, the initiator transmits training packets through total thirty-two (32) TX sectors—sectors 1 to 32. The responder receives the training packets with an omni-direction beam. The responder then selects four TX sectors with the best signal quality (e.g., TX sectors 1, 9, 25, and 28). The responder also sends the selected TX sectors back to the initiator.

Figure 4B:
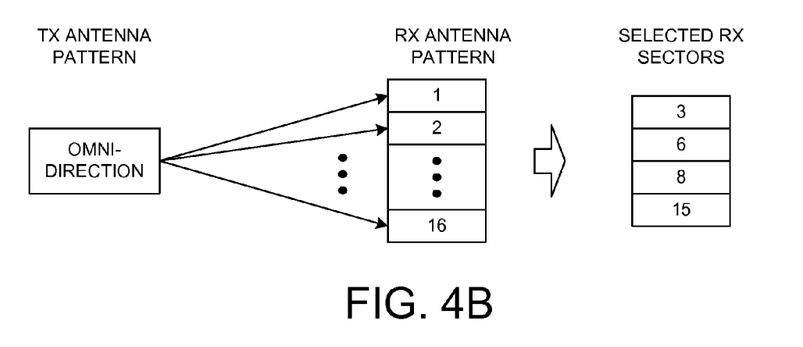
FIG. 4B illustrates a second step of the first embodiment of antenna beam training.

FIG. 4B illustrates a second step of the first embodiment of antenna beam training. The second step involves RX sector sweeping. In the example of FIG. 4B, the initiator transmits training packets using an omni-direction beam to the responder, while the responder receives the training packets sweeping through total sixteen (16) RX sectors—sectors 1 to 16. The responder then selects four RX sectors with the best signal quality (e.g., RX sectors 3, 6, 8, and 15).

Figure 4C:
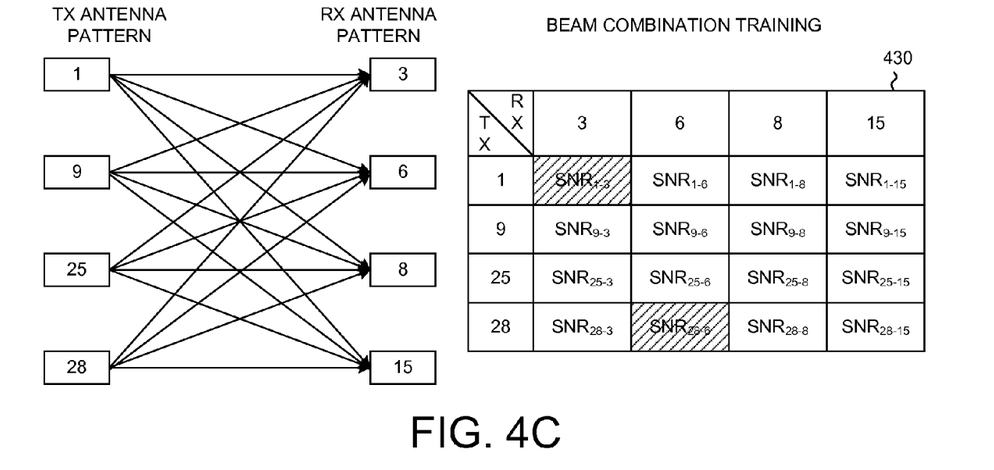
FIG. 4C illustrates a third step of the first embodiment of antenna beam training.

FIG. 4C illustrates a third step of the first embodiment of antenna beam training. The third step involves beam combination training using the selected TX sectors and the selected RX sectors. In the example of FIG. 4C, the initiator transmits training packets sweeping through the selected TX sectors (1, 9, 25, and 28), while the responder receives the packets sweeping through the selected RX sectors (3, 6, 8, and 15). The responder then records the signal quality (SNR) for all sixteen (4 TX sectors×4 RX sectors=16) beam combinations, as depicted by table 430.

The best MIMO beam combinations for multiple MIMO spatial streams are selected from the sixteen beam combinations. The best beam combination typically means the highest signal quality (SNR). However, in order to select the best beam combinations for multiple spatial streams, the selection criteria needs to include the interference or leakage between the spatial streams. Suppose TX1-RX3 sector pair and TX28-RX6 sector pair are selected as the MIMO beam combinations for two MIMO spatial streams SS1 and SS2, respectively. The received signal power from TX1 to RX6 becomes the interference to the TX28-RX6 pair, and the received signal power from TX28 to RX3 becomes the interference to the TX1-RX3 pair. After considering the mutual interference or leakage, the responder determines the best two beam combinations for two spatial streams.

Figure 5:
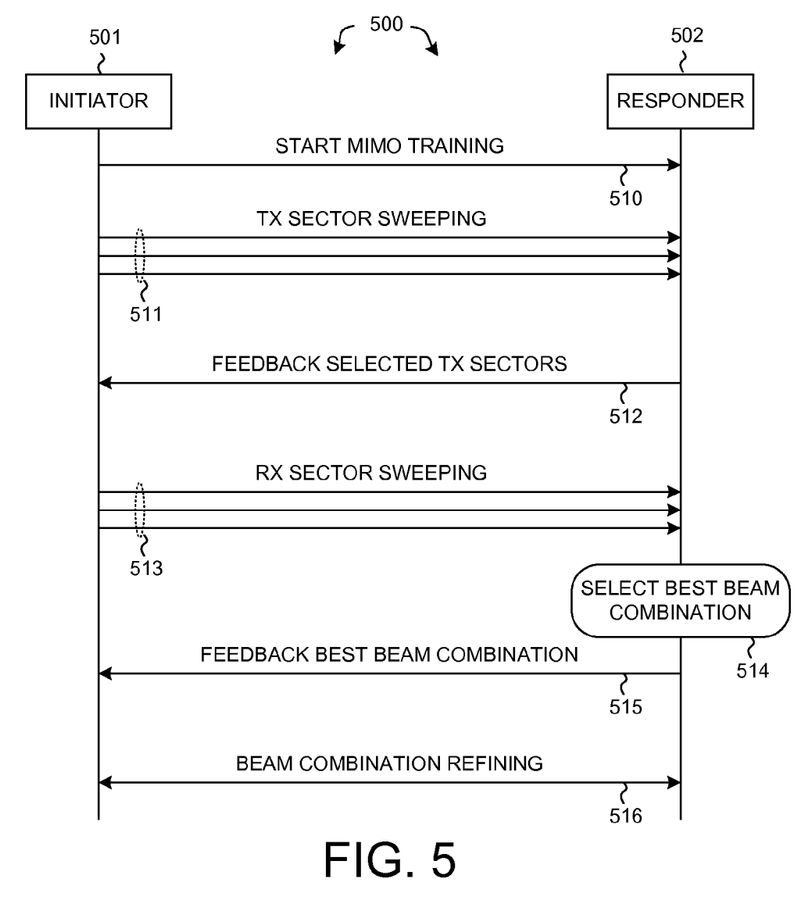
FIG. 5 illustrates a message/signal exchange flow of a second embodiment of antenna beam training for MIMO operation.

FIG. 5 illustrates a message/signal exchange flow of a second embodiment of antenna beam training for MIMO operation in a wireless communications system 500. Wireless communications system 500 comprises an initiator 501 and a responder 502. In step 510, the initiator sends a MIMO beam-training message to the responder to start a MIMO training procedure. The beam-training message comprises MIMO training parameters such as the number of TX sectors, the number of RX sectors, the number of MIMO spatial streams, the number of candidate beam combinations, and other relevant parameters. For example, the duration and timing of training packets may be included as part of the parameters. In the example of FIG. 5, the initiator is the transmitter of MIMO signal. However, an initiator can also initiate a MIMO training in which it is the receiver of MIMO signal.

In step 511, during TX sector sweeping, initiator 501 starts sending training packets to responder 502. Each training packet is a short packet designed for beam training—allowing the receiver to measure the received signal quality, but not carrying extra data payload to reduce time. For TX sector sweeping, the training packets are sent through all the TX sectors—one packet per sector with a gap (inter-frame spacing) between consecutive training packets. Responder 502 receives the training packets with omni-direction antenna pattern and records the received signal quality for each TX sector. In step 512, responder 502 feedbacks a set of selected TX sectors with good received signal quality to initiator 501. In step 513, RX sector sweeping is performed. In the second embodiment, instead of using omni-direction beam for transmitting training packets, initiator 501 transmits through one of the selected TX sectors a number of training packets (corresponding to the number of RX sectors to be swept), while responder 502 sweeps through all the RX sectors. The initiator repeats this process for each selected TX sector while the responder sweeps through all the RX sectors for each selected TX sector. The dwell time of each RX sector corresponds to a training packet duration and timing. Responder 502 again records the received signal quality and selects one RX sector with good signal quality for each selected TX sector.

In step 514, responder 502 determines the best MIMO beam combinations for multiple MIMO spatial streams based on the results of the TX sector sweeping and the RX sector sweeping. No additional beam combination training is necessary in the second embodiment. If there are two MIMO spatial streams, then the two best MIMO beam combinations are determined. For spatial multiplexing, the best MIMO beam combinations are determined based on the highest SNIR. For spatial combining, the best MIMO beam combinations are determined based on the highest total combined power (SUM power). In step 515, responder 502 feedbacks the best MIMO beam combinations to initiator 501. Finally, in step 516, initiator 501 and responder 502 perform beam combination refining, which fine-tunes the antenna beams for improved pointing accuracy and higher signal quality. More details of the second MIMO training embodiment are now described below accompanied with FIGS. 6A-6B.

Figure 6A:
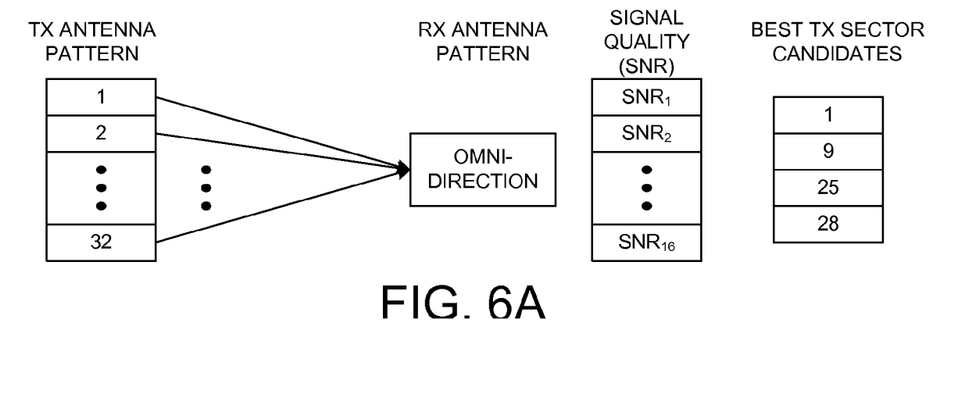
FIG. 6A illustrates a first step of the second embodiment of antenna beam training.

FIG. 6A illustrates a first step of the second embodiment of antenna beam training. The first step involves TX sector sweeping after initializing a MIMO training between an initiator and a responder. In the example of FIG. 6A, which is similar to FIG. 4A of the first embodiment, the initiator transmits training packets through total thirty-two (32) TX sectors—sectors 1 to 32. The responder receives the training packets with an omni-direction beam. The responder then selects four TX sectors with the best signal quality (e.g., TX sectors 1, 9, 25, and 28). The responder also sends the selected TX sectors back to the initiator.

Figure 6B:
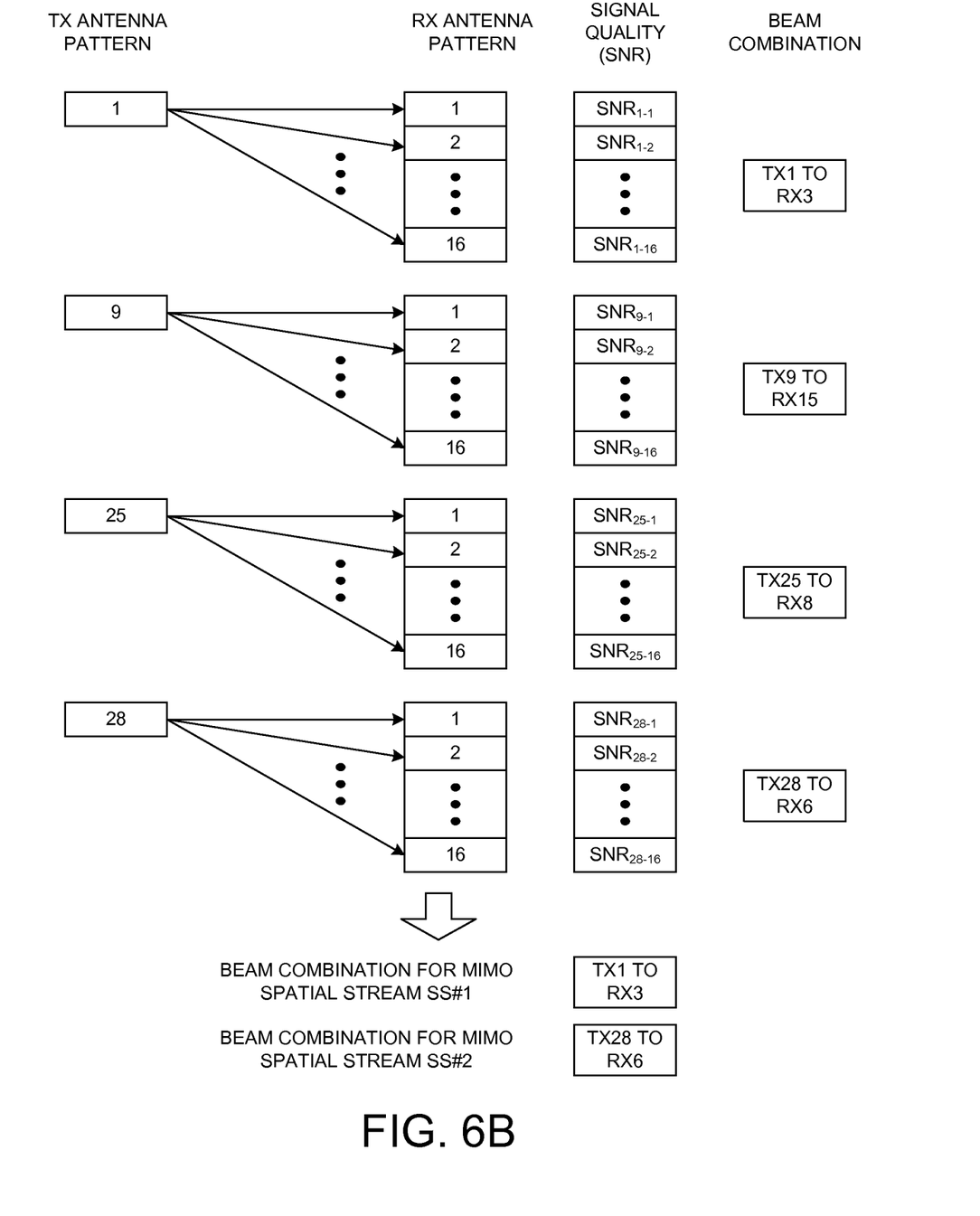
FIG. 6B illustrates a second step and a third step of the second embodiment of antenna beam training.

FIG. 6B illustrates a second step and a third step of the second embodiment of antenna beam training. The second step involves RX sector sweeping. In the example of FIG. 6B, the initiator transmits training packets using each of the selected TX sector (1, 9, 25, and 28) to the responder, while the responder receives the training packets sweeping through total sixteen (16) RX sectors—sectors 1 to 16. The responder then selects one RX sector with the highest signal quality for each of the selected TX sector (e.g., RX sectors 3, 6, 8, and 15 for TX sectors 1, 9, 25, and 28 respectively).

The third step involves the final selection of the best MIMO beam combinations. The already selected four TX-RX sector pairs are based on signal quality. In order to find the best beam combinations for multiple spatial streams, the selection criteria needs to include the mutual interference or leakage between the spatial streams. After considering the mutual interference or leakage, the best two beam combinations are finally determined. For example, TX1-RX3 sector pair is selected for a first spatial stream SS#1, and TX28-RX6 sector pair is selected for a second spatial stream SS#2. In this case, the received signal power from TX1 to RX6 becomes the interference to the TX28-RX6 pair, and the received signal power from TX28 to RX3 becomes the interference to the TX1-RX3 pair. Based on both the SNR and SNIR information, the TX1-RX3 and TX28-RX6 beam combinations are the best beam combinations for MIMO SS#1 and SS#2.

Note that the second embodiment overall requires more training packets as compared to the first embodiment. From implementation perspective, the difference between the first embodiment and the second embodiment is whether the transmitting device needs to send training packets using omni-direction antenna pattern. The second embodiment does not require the implementation of semi-omni transmit antenna. In general, receiver omni-pattern is easier to form since one single antenna element would provide near omni pattern. The receiver omni-antenna gain is lower than the array antenna gain by the array gain. For transmitter, however, it is difficult to provide an omni-pattern. If a single antenna is used for generating omni-directional pattern, not only the antenna gain is reduced by the array gain but also the power gain is reduced proportional to how many power amplifiers are not used. As a result, the effective isotropic radiated power (EIRP) is reduced by array gain plus power gain.

Figure 7:
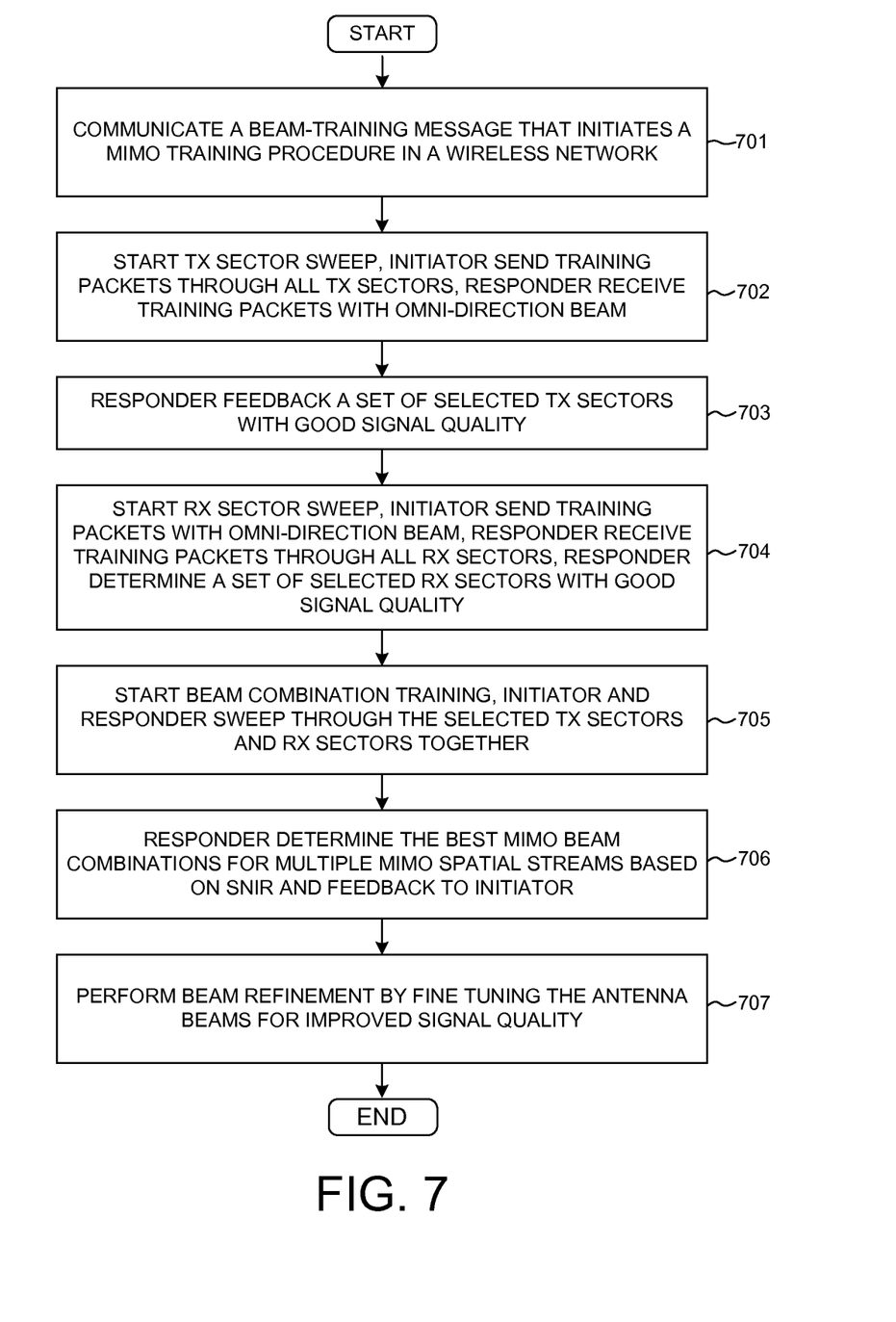
FIG. 7 is a flow chart of a first embodiment of a method of antenna beam training for MIMO operation in accordance with a novel aspect.

FIG. 7 is a flow chart of a first embodiment of a method of antenna beam training for MIMO operation in accordance with a novel aspect. In step 701, an initiator communicates with a responder a MIMO beam-training message to start a MIMO training procedure in a wireless network. The initiator is the transmitter of MIMO signal and the responder is the receiver of MIMO signal. Alternatively, the receiver of MIMO signal may also initiate the MIMO training procedure. In step 702, TX sector sweeping is started. The initiator sends training packets through all TX sectors, and the responder receives the training packets with omni-direction beam. In step 703, the responder sends a set of selected TX sectors with good received signal quality back to the initiator. In step 704, RX sector sweeping is started. The initiator sends training packets with omni-direction beam, and the responder receives the training packets through all RX sectors. The responder then determines a set of selected RX sectors with good received signal quality. In step 705, beam combination training is started. The initiator and the responder sweep through the selected TX sectors and RX sectors together. The responder records the received signal quality. In step 706, the responder determines the best MIMO beam combinations for multiple MIMO spatial streams based on signal quality and based on interference or leakage among the different spatial streams. In step 707, beam refinement is performed to fine-tune the antenna beams for improved signal quality.

Figure 8:
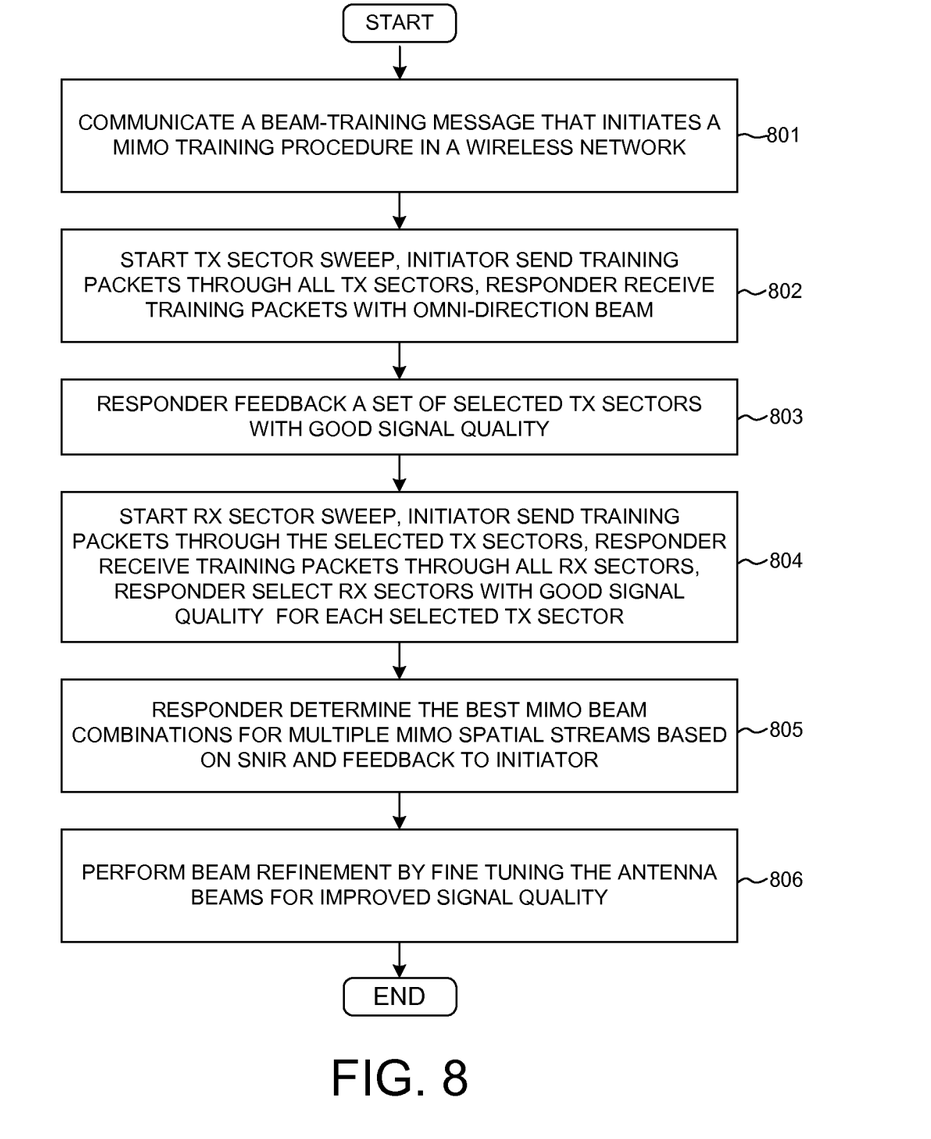
FIG. 8 is a flow chart of a second embodiment of a method of antenna beam training for MIMO operation in accordance with a novel aspect.

FIG. 8 is a flow chart of a second embodiment of a method of antenna beam training for MIMO operation in accordance with a novel aspect. In step 801, an initiator communicates with a responder a MIMO beam-training message to start a MIMO training procedure in a wireless network. The initiator is the transmitter of MIMO signal and the responder is the receiver of MIMO signal. Alternatively, the receiver of MIMO signal may also initiate the MIMO training procedure. In step 802, TX sector sweeping is started. The initiator sends training packets through all TX sectors, and the responder receives the training packets with omni-direction beam. In step 803, the responder sends a set of selected TX sectors with good received signal quality back to the initiator. In step 804, RX sector sweeping is started. The initiator sends training packets using one of the selected TX sectors, and the responder receives the training packets through all RX sectors. The initiator repeats the process for each selected TX sector. The responder then determines a set of selected RX sectors with good received signal quality for each selected TX sector. In step 805, the responder determines the best MIMO beam combinations for multiple MIMO spatial streams based on signal quality and based on interference or leakage among the different spatial streams. In step 806, beam refinement is performed to fine-tune the antenna beams for improved signal quality.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
  communicating a beam-training message that initiates a multiple input and multiple output (MIMO) training procedure in a wireless network;
  transmitting training packets using all TX sectors during TX sector sweeping and in response obtaining a set of selected TX sectors, wherein each of the TX sectors corresponds to a specific TX antenna beam;
  transmitting training packets using omni-direction antenna pattern during RX sector sweeping and in response obtaining a set of selected RX sectors, wherein each of the RX sectors corresponds to a specific RX antenna beam;
  starting MIMO beam combination training based on the selected TX and RX sectors by transmitting training packets using the selected TX sectors, wherein each MIMO beam combination includes one of the selected TX sectors and one of the selected RX sectors; and obtaining one or more best MIMO beam combinations for multiple MIMO spatial streams, wherein each of the best MIMO beam combinations is selected based on the results of the MIMO beam combination training.

2. The method of claim 1, wherein the beam-training message comprises parameters including a number of TX sectors, a number of RX sectors, a number of MIMO spatial streams, and a number of beam combinations.

3. The method of claim 1, wherein the selected TX and RX sectors are determined based on signal to noise ratios (SNRs).

4. The method of claim 1, wherein the best MIMO beam combinations are determined based on signal to noise plus interference ratios (SNIRs).

5. The method of claim 1, wherein the beam combination training involves sweeping the selected TX sectors and the selected RX sectors together.

6. A method comprising:
communicating a beam-training message that initiates a multiple input and multiple output (MIMO) training procedure in a wireless network;
receiving training packets using omni-direction antenna pattern during TX sector sweeping and in response determine a set of selected TX sectors, wherein each of the TX sectors corresponds to a specific TX antenna beam;
receiving training packets using all RX sectors during RX sector sweeping and in response determine a set of selected RX sectors, wherein each of the RX sectors corresponds to a specific RX antenna beam;
starting MIMO beam combination training based on the selected TX and RX sectors by receiving training packets from the selected TX sectors using the selected RX sectors, wherein each of the MIMO beam combinations includes one of the selected TX sectors and one of the selected RX sectors; and
determining one or more best MIMO beam combinations for multiple MIMO spatial streams based on the results of the MIMO beam combination training.

7. The method of claim 6, wherein the beam-training message comprises parameters including a number of TX sectors, a number of RX sectors, a number of MIMO spatial streams, and a number of beam combinations.

8. The method of claim 6, wherein the selected TX and RX sectors are determined based on signal to noise ratios (SNRs).

9. The method of claim 6, wherein the best MIMO beam combinations are determined based on signal to noise plus interference ratios (SNIRs).

10. The method of claim 6, wherein the training packets during the RX sector sweeping are transmitted with an omni-direction antenna pattern.

11. A method comprising:
communicating a beam-training message that initiates a multiple input and multiple output (MIMO) training procedure in a wireless network;
transmitting training packets using all TX sectors during TX sector sweeping and in response obtaining a set of selected TX sectors, wherein each of the TX sectors corresponds to a specific TX antenna beam;
transmitting training packets using the selected TX sectors during RX sector sweeping and in response obtaining a set of selected RX sectors corresponding to each of the selected TX sectors, wherein each of the RX sectors corresponds to a specific RX antenna beam; and
obtaining one or more best MIMO beam combinations for multiple MIMO spatial streams, wherein each of the MIMO beam combinations includes one of the selected TX sectors and one of the selected RX sectors, wherein the selected TX and RX sectors are determined based on signal to noise ratios (SNRs) and the selected MIMO beam combinations are determined based on signal to noise plus interference ratios (SNIRs).

12. The method of claim 11, wherein the beam-training message comprises parameters including a number of TX sectors, a number of RX sectors, a number of MIMO spatial streams, and a number of beam combinations.

13. The method of claim 11, wherein the training packets during the RX sector sweeping are repeated for a number of total RX sectors for each of the selected TX sectors.

14. A method comprising:
communicating a beam-training message that initiates a multiple input and multiple output (MIMO) training procedure in a wireless network;
receiving training packets using omni-direction antenna pattern during TX sector sweeping and in response determine a set of selected TX sectors, wherein each of the TX sectors corresponds to a specific TX antenna beam;
receiving training packets using all RX sectors during RX sector sweeping and in response determining a set of selected RX sectors corresponding to each of the selected TX sectors, wherein each of the RX sectors corresponds to a specific RX antenna beam; and
determining one or more best MIMO beam combinations from the selected TX and RX sectors for multiple MIMO spatial streams, wherein each of the MIMO beam combinations includes one of the selected TX sectors and one of the selected RX sectors, wherein the selected TX and RX sectors are determined based on signal to noise ratios (SNRs) and the selected MIMO beam combinations are determined based on signal to noise plus interference ratios (SNIRs).

15. The method of claim 14, wherein the beam-training message comprises parameters including a number of TX sectors, a number of RX sectors, a number of MIMO spatial streams, and a number of beam combinations.

16. The method of claim 14, wherein the training packets during the RX sector sweeping are transmitted using each of the selected TX sectors.

* * * * *